United States Patent
Yamamoto et al.

(10) Patent No.: US 6,452,297 B2
(45) Date of Patent: Sep. 17, 2002

(54) MOTOR DEVICE HAVING COMMUTATOR AND BRUSH OUTSIDE YOKE

(75) Inventors: Toshio Yamamoto, Kosai; Yoshihiko Harada, Hamamatsu, both of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/788,543

(22) Filed: Feb. 21, 2001

(30) Foreign Application Priority Data

Mar. 22, 2000 (JP) ........................................ 2000-079700

(51) Int. Cl.⁷ .............................. H02K 5/00; H02K 7/10; H02K 13/00
(52) U.S. Cl. ........................... 310/89; 310/83; 310/233; 310/238
(58) Field of Search ................................ 310/239, 238, 310/89, 75 R, 85, 80, 127, 128, 240–247, 83, 229, 233, 248

(56) References Cited

U.S. PATENT DOCUMENTS

| | | | | |
|---|---|---|---|---|
| 1,829,856 A | * | 11/1931 | Edison | 310/239 |
| 2,947,895 A | * | 8/1960 | Wray | 310/239 |
| 3,162,782 A | * | 12/1964 | Downs | 310/239 |
| 3,259,770 A | * | 7/1966 | Mattson et al. | 310/239 |
| 3,271,013 A | * | 9/1966 | Chambers et al. | 310/239 |
| 3,451,087 A | * | 6/1969 | Jepson et al. | 310/89 |
| 3,745,393 A | * | 7/1973 | Spors | 310/239 |
| 4,527,960 A | * | 7/1985 | Desisto | 417/368 |
| 4,705,972 A | * | 11/1987 | Baines | 310/71 |
| 5,576,588 A | * | 11/1996 | Moribayashi et al. | 310/83 |
| 5,872,412 A | * | 2/1999 | Mita et al. | 310/83 |
| 5,974,623 A | * | 11/1999 | Cummins et al. | 15/347 |
| 6,066,907 A | * | 5/2000 | Matsushima et al. | 310/239 |
| 6,163,096 A | * | 12/2000 | Michenfelder et al. | 310/239 |

FOREIGN PATENT DOCUMENTS

| | | | | |
|---|---|---|---|---|
| EP | 474904 A1 | * | 3/1992 | H02K/7/116 |
| JP | 8-258730 | | 10/1996 | |
| JP | 9-117093 | | 5/1997 | |
| JP | 2000245105 A | * | 9/2000 | H02K/5/04 |
| WO | WO-009900885 A1 | * | 1/1999 | |

* cited by examiner

Primary Examiner—Nestor Ramirez
Assistant Examiner—Guillermo Perez
(74) Attorney, Agent, or Firm—Law Offices of David G. Posz (57) ABSTRACT

A motor device comprises a motor unit and a reduction unit. The motor unit comprises a yoke which is formed in a generally bottomed cylindrical shape, and a rotor having an armature and a rotary shaft. The reduction unit comprises a gear housing accommodating a reduction gear device for producing an output after reducing rotational speed of the rotor and fixed to the opening of the yoke. A commutator and brushes for the motor unit are disposed in the gear housing which is provided outside the opening of the yoke in the axial direction of the rotary shaft. The gear housing has a flange formed in a square shape, and the brushes are arranged along the diagonal lines of the square shape.

8 Claims, 5 Drawing Sheets

MOTOR DEVICE HAVING COMMUTATOR AND BRUSH OUTSIDE YOKE

CROSS REFERENCE TO RELATED APPLICATION

This application is based on and incorporates herein by reference Japanese patent application No. 2000-79700 filed Mar. 22, 2000.

BACKGROUND OF THE INVENTION

1. Field of the Invention

The present invention relates to a motor device in which a commutator and brushes are disposed in a reduction unit outside a yoke.

2. Related Art

In a conventional motor device, an electric motor unit has a cylindrical yoke and a rotor, and a reduction unit including reduction gears therein is coupled to the yoke. The rotor is primarily comprised of a rotary shaft for driving the reduction gears, an armature, a cylindrical commutator and elongate brushes. The armature and the commutator are fixed to the rotary shaft and arranged in the axial direction of the rotary shaft. The brushes are spring-biased to contact the commutator in the radial direction of the commutator. The rotor is entirely accommodated within the yoke. According to this arrangement, the length of the brushes is restricted by the inner periphery of the yoke. As the brushes wear during operation of the motor device, the life of the motor device is limited by the life of brushes.

SUMMARY OF THE INVENTION

It is therefore an object of the present invention to provide a motor device which is capable of employing lengthened brushes.

According to the present invention, a motor device has a motor unit and a reduction unit coupled with the motor unit. A commutator and brushes are disposed within a gear housing of the reduction unit located outside the opening of a yoke of the motor unit in an axial direction of the motor unit. Preferably, the gear housing is formed with a brush accommodating recess, at least a part of which is larger than an inner periphery of the yoke in a radial direction. The brushes are disposed within the brush accommodating recess. The brush accommodating recess is formed in a generally square shape, each brush is disposed along a diagonal line of the square shape.

BRIEF DESCRIPTION OF THE DRAWINGS

The above and other objects, features and advantages of the present invention will readily become more apparent from the following detailed description made with reference to the accompanying drawings. In the drawings.

DETAILED DESCRIPTION OF THE PREFERRED EMBODIMENT

The present invention will be described below with reference to various embodiments shown in FIGS. 1 to 7 and modifications thereof.

First Embodiment

Figure 1:
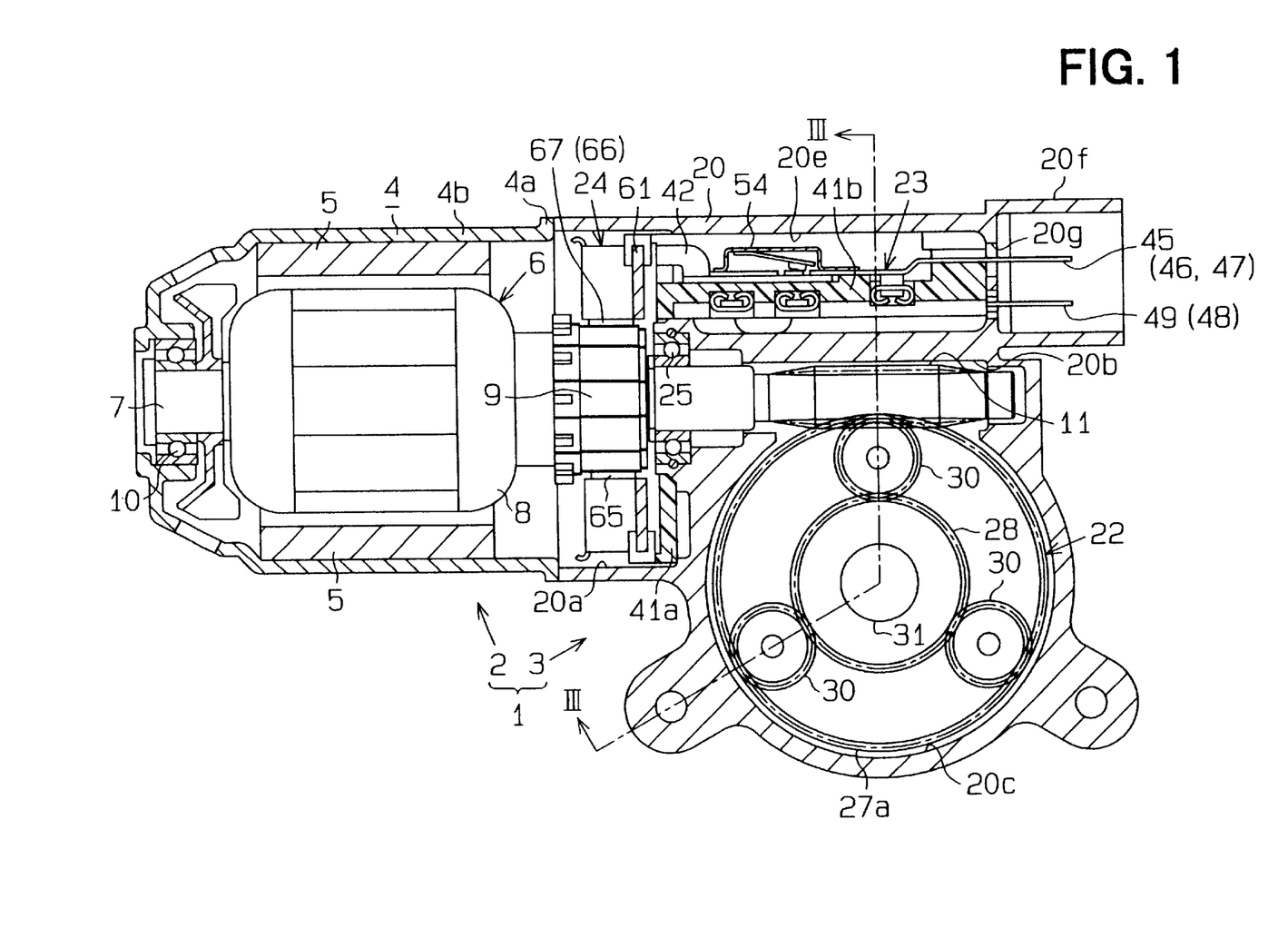
FIG. 1 is a sectional view showing a motor device according to a first embodiment of the present invention.

As shown in FIG. 1, a motor device 1 comprises a motor unit 2 and a reduction unit 3. The motor unit 2 has a yoke 4, which is generally in a bottomed cylindrical shape having an opening at one end, a plurality of magnets 5 fixed to the inner peripheral surface of the yoke 4, and a rotor 6 generally accommodated in the yoke 4.

Figure 2:
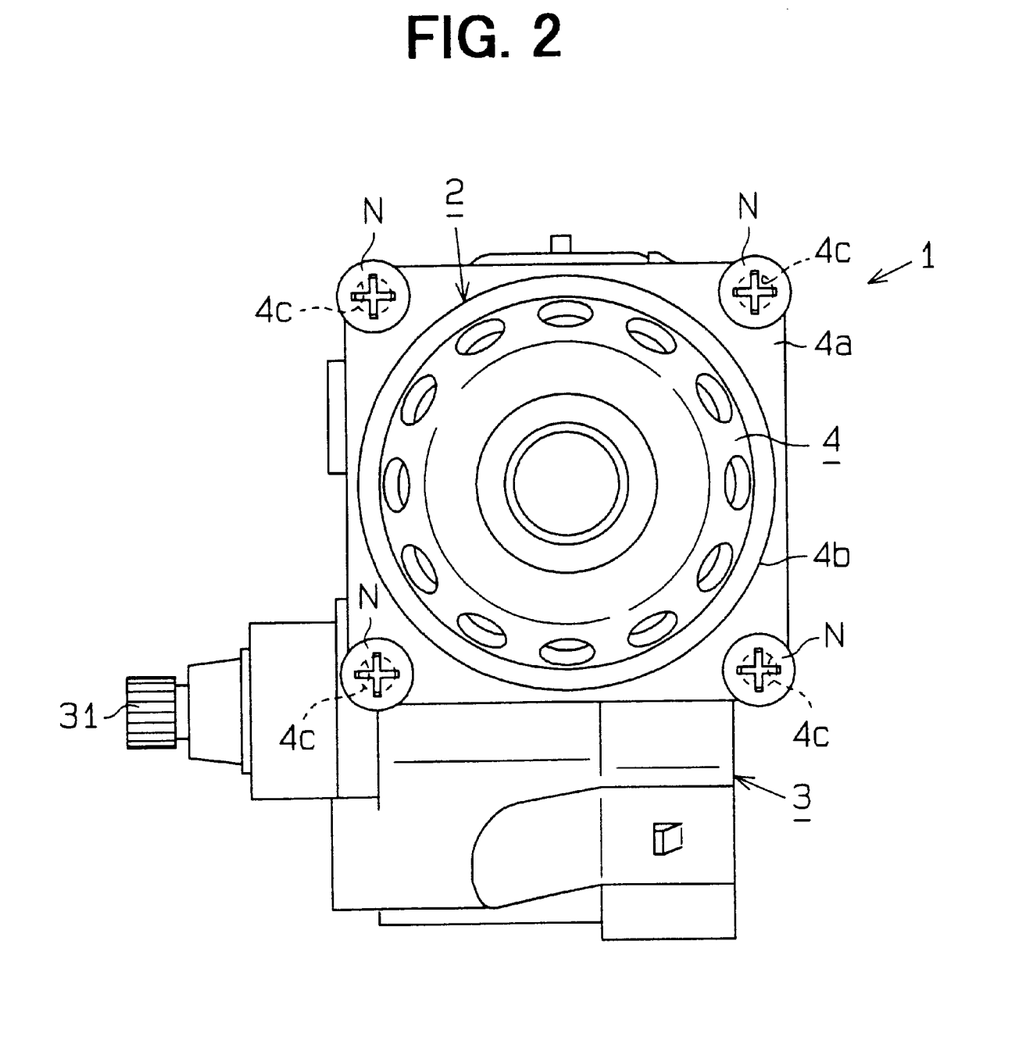
FIG. 2 is a left side view showing the motor device according to the first embodiment.

As shown in FIG. 2, the yoke 4 is formed at its opening with a flange 4a, which extends in the radial direction into a generally square shape when viewed in the axial direction. The length of each side of this flange 4a is set to be a little longer than a diameter of the cylindrical part 4b of the yoke 4. The flange 4a is formed with a screw hole 4c at its each corner.

Referring back to FIG. 1, the rotor 6 has a rotary shaft 7, an armature 8 and a commutator 9. The rotary shaft 7 has a base end supported rotatably by a bearing 10 disposed at the bottom side (left side end in FIG. 1) of the yoke 4. The armature 8 is fixedly disposed at the base end side of the rotary shaft 7 in a manner to face the magnets 5. The commutator 9 is formed in a cylindrical shape and fixedly disposed around the rotary shaft 7 on a side of the reduction unit 3. The commutator 9 is disposed to protrude from the opening of the yoke 4, that is, it is disposed in the reduction unit 3 that is outside the opening of the yoke 4 in the axial direction of the rotary shaft 7. The rotary shaft 7 is formed with a worn 11 at its end side.

Figure 3:
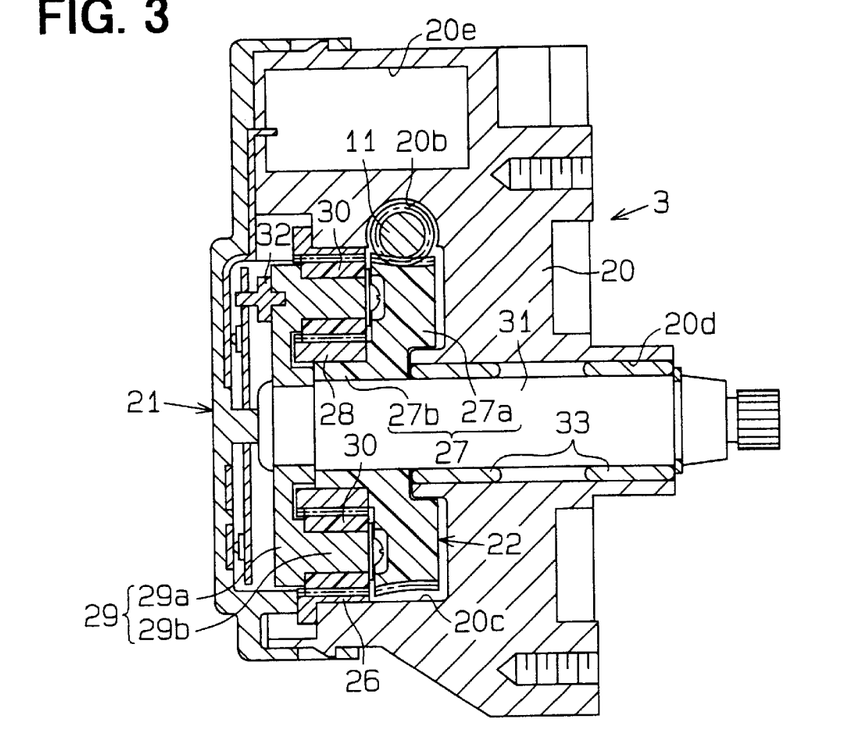
FIG. 3 is a sectional view of the motor device taken along a line III—III in FIG. 1.
Figure 4:
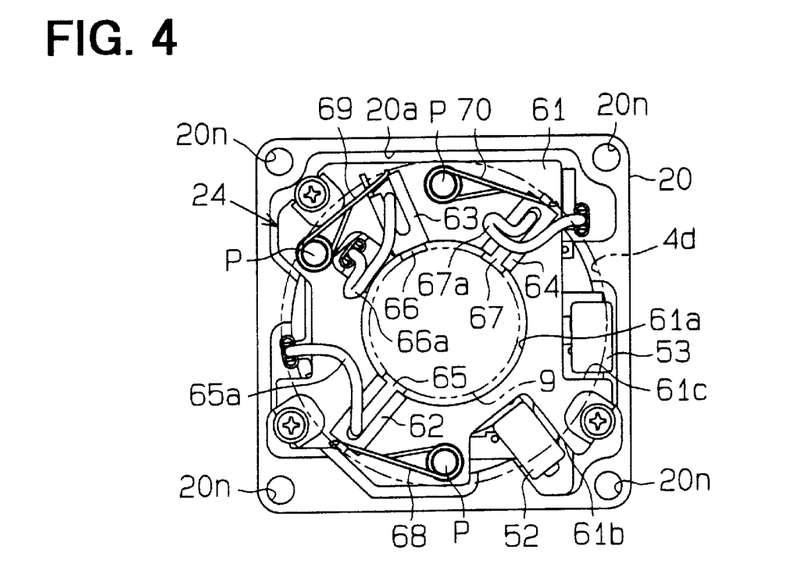
FIG. 4 is a side view showing a brush arrangement in the first embodiment.

The reduction unit 3 has a gear housing 20, a cover 21 (FIG. 3), and a reduction gear device 22, an electric circuit unit 23 and a brush holder unit 24. The side end of the gear housing 20 fixedly coupled to the yoke 4 is formed in generally a square shape in correspondence with the square shape of the flange 4a of the yoke 4 when viewed in the axial direction of the rotary shaft 7. The side end of the gear housing 20 is recessed to provide a brush accommodating recess 20a in generally a square shape when viewed in the axial direction of the rotary shaft 7. Further, as shown in FIG. 4, female threads 20n are formed in the corners of the side end. Here, the length of each side of the brush accommodating recess 20a is sized to be generally equal to the diameter of the cylindrical part 4b of the yoke 4.

The gear housing 20 is formed with a worm accommodating chamber 20b, which extends from the bottom center of the brush accommodating recess 20a to accommodate the top end side (worm 11) of the rotary shaft 7. Further, the gear housing 20 is formed with a wheel accommodating chamber 20c, which communicates with the worm accommodating chamber 20b, in a direction (downward direction in FIG. 1) orthogonal to the axial direction at the central part of the worm accommodating chamber 20b. The wheel accommodating chamber 20c is formed in a generally circular shape when viewed in a direction orthogonal to the axis of the rotary shaft 7. As shown in FIG. 3, its one end side (left side in the figure) is open. An output shaft central hole 20d, which passes to the outside, is formed in the center of the other side of the wheel accommodating chamber 20c.

Further, the gear housing 20 is formed with a circuit accommodating chamber 20e, which extends from the bottom of the brush accommodating recess 20a in parallel with the worm accommodating chamber 20b. Further, the gear housing 20 is formed with a connector body 20f at the top end side (right side in FIG. 1) of the circuit accommodating chamber 20e. The connector body 20f is formed in a generally cylindrical shape, which is open at the side opposite the opening of the brush accommodating recess 20a. The connector body 20f is formed in its bottom with a through hole 20g, which passes to the circuit accommodating chamber 20e.

The gear housing 20 is fixed to the yoke 4, as shown in FIG. 2, by screws N which are threaded into the female threads 20n passing through the screw holes 4c. The opening of the brush accommodating recess 20a is covered by the flange 4a under this condition. A bearing 25 is disposed in the opening of the worm accommodating chamber 20b to rotatbly support the intermediate part of the rotary shaft 7.

As shown in FIG. 3 (not shown in FIG. 1), an internal wheel gear 26 is disposed in the inner periphery of the wheel accommodating chamber 20c. This internal wheel gear 26 is disposed in a manner offset from the worm 11 in the axial direction of the wheel accommodating chamber 20c, that is, in the direction orthogonal to the drawing sheet in FIG. 1 and in the leftward direction in FIG. 3.

The reduction gear device 22 is accommodated within the wheel accommodating chamber 20c. Specifically, as shown in FIG. 3, the reduction gear device 22 has a wheel 27, a sun gear 28, a carrier 29, three (only two are shown in FIG. 3) planetary gears 30 and an output shaft 31. The wheel 27 has a ring-shaped worm wheel 27a having teeth on its outer periphery for engagement with the worm 11, and a tubular part 27b protruding from the inner periphery of the worm wheel 27a in the axial direction (leftward direction in FIG. 3).

The sun gear 28 is fit on the tubular part 27b to be rotatable therewith. The carrier 29 has a circular disk 29a and a plurality of support pins 29b extending from the surface of the disk 29a in the axial direction (rightward direction in FIG. 3) in equi-angularly (120°) spaced relation from each other. A fitting pin 32 is fixed to the opposite side of the disk 29a at a position corresponding to one support pin 29b.

Each planetary gear 30 is supported rotatably about the support pin 29b and meshed with the internal wheel gear 26 and the sun gear 28. The output shaft 31 has an intermediate part which passes through the tubular part 27b, and is rotatable relative to the inner peripheral surface of the tubular part 27b. Its base end is insert-fit in the disk 29a of the carrier 29 to be rotatable therewith.

That is, the reduction gear device 22 is accommodated within the wheel accommodating chamber 20c in such a manner that the top end side of the output shaft 31 is insert-supported by a pair of sliding bearing 33 fixed to the output shaft central hole 20d, the teeth of the worm wheel 27a meshes with the worm 11 and each planetary gear 30 meshes with the internal wheel gear 26. Thus, when the rotary shaft 7 (worm 11) rotates, the wheel 27 rotates, the planetary gears 30 revolve around the sun gear 28 while rotating themselves based on the rotation of the wheel 27, and the carrier 29 and the output shaft 31 rotate in response to the revolution of the planetary gears 30. That is, the reduction unit of this motor device 1 produces output while reducing the rotation speed of the rotary shaft 7 (rotor 6) in two stages by the worm gear and the planetary gears 30.

Figure 5:
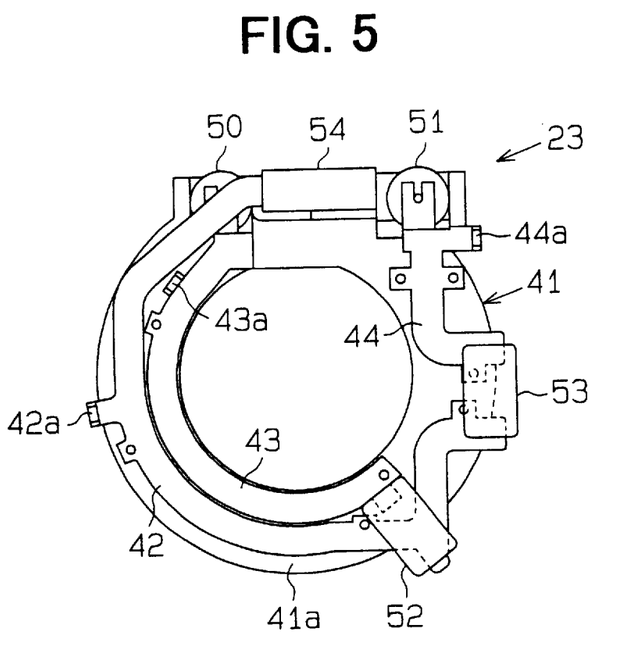
FIG. 5 is a left side view showing a circuit unit in the first embodiment.
Figure 6:
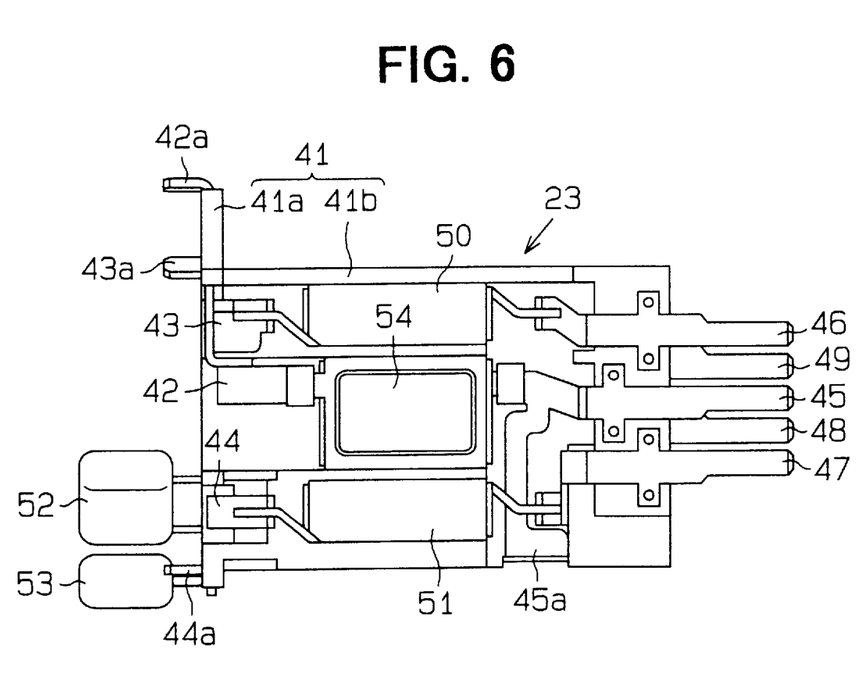
FIG. 6 is a plan view showing the circuit unit in the first embodiment.

The circuit unit 23 is accommodated within the circuit accommodating chamber 20e. Specifically, as shown in FIGS. 1, 5 and 6, the circuit unit 23 has a main body 41, three brush wiring terminals 42–44, five external terminals 45–49, two choke coils 50, 51, two capacitors 52, 53, and a circuit breaker 54 as a burn-out protection device. FIGS. 5 and 6 are a left side view and a plan view of the circuit unit 23. In this embodiment, two choke coils 50, 51 and two capacitors 52, 53 form a noise suppressing device.

The main body 41 is made of resin, and has an annular disk 41a and an insertion plate 41b extending in the axial direction from a part of the disk 41a and formed in a generally rectangular shape. As shown in FIG. 5, the brush wiring terminals 42–44 and the capacitors 52, 53 are mounted on the surface of the disk 41a. The capacitors 52, 53 are provided in such a manner to protrude from the surface of the disk 41a. The brush wiring terminal 42 is for common connection to the ground, the brush wiring terminal 43 is for connection to a high voltage power source for high speed operation, and the brush wiring terminal 44 is for connection to a high voltage power source for low speed operation. The capacitor 52 is connected between the brush wiring terminals 42 and 43, which are for common connection to the ground and for connection to the high voltage power source for high speed operation, respectively.

The capacitor 53 is connected between the brush wiring terminals 42 and 44, which are for common connection to the ground and for connection to the high voltage power source for low speed operation, respectively. The brush wiring terminals 42–44 are formed with brush connecting pieces 42a–44a, respectively. The ends of the brush wiring terminals 44 are bent and placed on the top surface of the insertion plate 41b.

As shown in FIG. 6, three terminals 45–47, two choke coils 50, 51 and the circuit breaker 54 are arranged in parallel on the central part of the insertion plate 41b in such a manner that the choke coils 50, 51 sandwiches the circuit breaker 54. The external terminals 45–47 are arranged so that the respective terminals thereof protrude from top ends. The brush wiring terminal 42 for common connection to the ground is connected to the external terminal 45 through the circuit breaker 54. The brush wiring terminal 43 for connection to the high voltage power source for high speed operation is connected to the external terminal 46 through the choke coil 50. The brush wiring terminal 44 for connection to the high voltage power source for high speed operation is connected to the external terminal 47 through the choke coil 51.

Two external terminals 48, 49 are mounted on the bottom surface of the insertion plate 41b. The external terminals 48, 49 are arranged in parallel so that respective ends at one side protrude from the top end of the insertion plate 41b. The external terminals 48, 49 are provided to output detection signals of a rotation sensor (not shown).

As shown in FIG. 1, the circuit unit 23 is fixed in such a manner that the insertion plate 41b is inserted into the circuit accommodating chamber 20e and the disk 41a is inserted into the brush accommodating recess 20a. The top ends of the external terminals 45–49 passe through the communication hole 20g and protrude into the connector body 20f, thus forming pins of the connector.

The brush accommodating recess 20a accommodates therein a brush holding unit 24. Specifically, as shown in FIG. 4, the brush holding unit 24 has a plate 61, three brush holders 62–64, three brushes 65–67 and three helical torsion springs 68–70.

The plate 61 is formed in a generally square shape to be accommodated within the brush accommodating recess 20a. The plate 61 formed with a central hole 61a in its center and cut-outs 61b, 61c at its outer peripheral ends while avoiding the capacitors 52, 53. Three brush holders 62–64 are fixed on the top surface of the plate 61. Each brush holder 62–64 supports respective brushes 65–67. The brush holders 62–64 and the brushes 65–67 are arranged generally along diagonal lines of the generally square-shaped plate 61.

In this embodiment, the brushes 65, 67 are arranged to oppose each other with respect to the center of the plate 61, and the brush 66 is disposed at a location which is 70° spaced apart from the brush 67. The brush holder 62 and the brush 65 are for connection to the common ground, the brush holder 63 and the brush 66 are for connection to the high voltage power source for high speed operation, and the brush holder 64 and the brush 67 are for connection to the high voltage power source for low speed operation. Pins P are provided on the plate 61 near brush holders 62–64 in the counter-clockwise direction, respectively. The brushes 65–67 are biased towards the commutator 9 (shown with two-dot chain line in FIG. 4) by the helical torsion springs 68–70, respectively.

The brush holder unit 24 is accommodated in the brush accommodating recess 20a in parallel with the disk 41a of the circuit unit 23. Pig tails 65a–67a of the brushes 65–67 are connected to corresponding connecting terminals 42a–44a, respectively. Each brush 65–67 is located outside the opening of the yoke 4 in the axial direction of the rotary shaft 7 together with the commutator 9.

As shown in FIG. 4, each brush 65–67 extends closely to the inner periphery (shown with two-dot chain line in FIG. 4) 4d of the yoke 4. The helical torsion springs 68–70 are partly disposed outside the inner periphery 4d in the radial direction. The capacitors 52, 53 are not in contact with the plate 61 under this condition due to the cut-outs 61b, 61c, and protrude above the plate 61. The capacitors 52, 53 are partly disposed outside the inner periphery 4d of the yoke 4 in the radial direction.

As shown in FIG. 3, the cover 21 is fixed to the opening of the wheel accommodating chamber 20c of the gear housing 20. A connector of an electronic motor control circuit device (not shown) is connected to the connector of the motor device 1, that is, the connector body 20f and the top ends of the external terminals 45–49.

In the motor device 1 constructed as above, the armature 8 generates magnetic field to rotate the rotor 6, when a direct current voltage is applied from the control circuit device to the external terminal 45, 47. The rotor 6 rotates at high speeds, when the direct current voltage is applied from the control circuit device to the external terminals 45, 46.

Electrical noises occur during this rotation, because the brushes 65, 67 (65, 66) slidingly contact the commutator 9. These electrical noises are suppressed by the inductance of the choke coil 51 (50) and the capacitance of the capacitor 53 (52). As a result, transmission of the electrical noises to the external control circuit device is suppressed, and radiation of electromagnetic noises arising from the electrical noises is restricted.

Further, the choke coil 51 (50) generates heat, when the winding of the armature 8 generates heat due to excessive current during rotation of the rotor 6, for instance, when a heavy load is applied to the side of the output shaft 31. The circuit breaker 54 is turned into a disconnection condition in accordance with the generated heat of the choke coil 51 (50), so that no more excessive current is supplied. Thus, burnout due to heat generation is prevented.

The first embodiment provides the following advantages.

(1) The commutator 9 and the brushes 65–67 are disposed outside the opening of the yoke 4, which is formed in a bottomed, generally cylindrical shape, in the axial direction of the rotary shaft 7. Thereby, the brushes 65–67 can be disposed without being restricted by the inner periphery 4d of the yoke 4. As a result, the length of the brushes can be increased to prolong life of the brushes. Further, members which are disposed on the same plane in the axial direction as the brushes 65–67, for instance, the helical torsion springs 67–70 which bias the brushes 65–67 towards the central axis side of the yoke 4, can also be disposed without being restricted by the inner periphery 4d of the yoke 4.

(2) The brushes 65–67 are arranged generally along the diagonal lines in the brush accommodating chamber 20a which is formed at the side end of the yoke 4 of the gear housing 20 and formed in a generally square shape when viewed in the axial direction of the rotary shaft 7. As a result, the length of the brushes can be maximized within the brush accommodating chamber 20a.

(3) The length of each side of the brush accommodating recess 20a is set to be generally equal to the diameter of the cylindrical part 4b of the yoke 4. As a result, the length of the brushes can be increased without sizing entirety of the motor device large.

(4) The opening of the brush accommodating chamber 20a is covered with the flange 4a which is formed at the opening side of the yoke and in a generally square shape when viewed in the axial direction of the rotary shaft. As a result, no additional member is required to cover the opening of the brush accommodating chamber 20a formed in a generally square shape when viewed in the axial direction of the rotary shaft 7.

(5) The capacitors 52, 53 are accommodated in the brush accommodating chamber 20a with parts thereof being disposed outside the inner periphery 4d of the yoke 4. As a result, space required for accommodating the capacitors 52, 53 is provided sufficiently, and no space is required at other locations.

Second Embodiment

Figure 7:
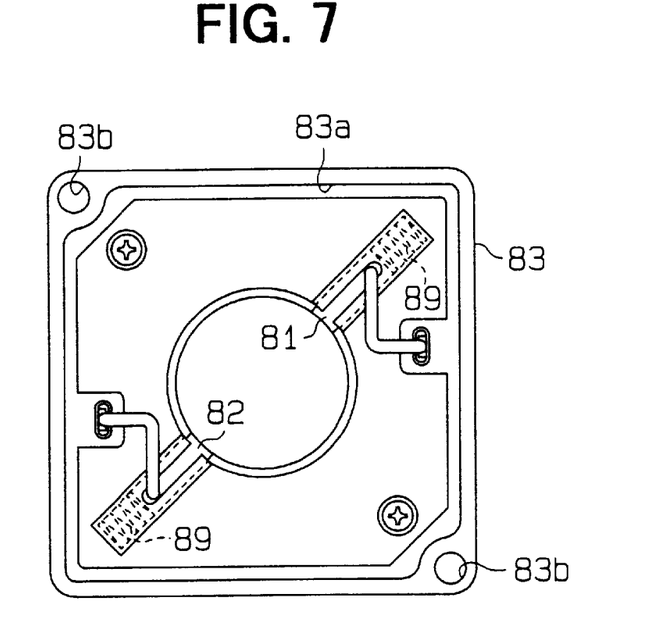
FIG. 7 is a side view showing a brush arrangement in a second embodiment of the present invention.

In this embodiment, the motor device 1 has two brushes 81, 82 as shown in FIG. 7. Specifically, the yoke-side end of a gear housing 83 is formed in a generally square shape when viewed in the axial direction of the rotary shaft 7 in the same manner as in the gear housing 20. This end is formed in a generally square shape when viewed in the axial direction of the rotary shaft 7. Further, as the housing-side engagement parts, female threads 83b are formed in the two opposing corners at the yoke-side end of the gear housing 83.

The two brushes 81, 82 are arranged at the other corners where the female threads 83b are not formed along the generally diagonal lines in the brush accommodating chamber 83a. In this instance, the screw holes 4c of the yoke 4 need to be provided only in the two corners which correspond to the female threads 83b. The screw holes 4c function as the yoke-side engagement parts in this modification. Thus, the gear housing 83 is fixed to the yoke 4 by threading screws into the female threads 83b through the thread holes 4c.

In this embodiment, the advantages (1)–(4) of the first embodiment can be provided similarly. In addition, because the gear housing 83 and the yoke 4 are fixed to each other at the part of the female threads 83b formed in the two corners of the gear housing 83 where the brushes 81, 82 are not disposed, the gear housing 83 and the yoke 4 can be fixed with ease while ensuring a sufficient space for arranging the brushes 81, 82.

Third Embodiment

Figure 8:
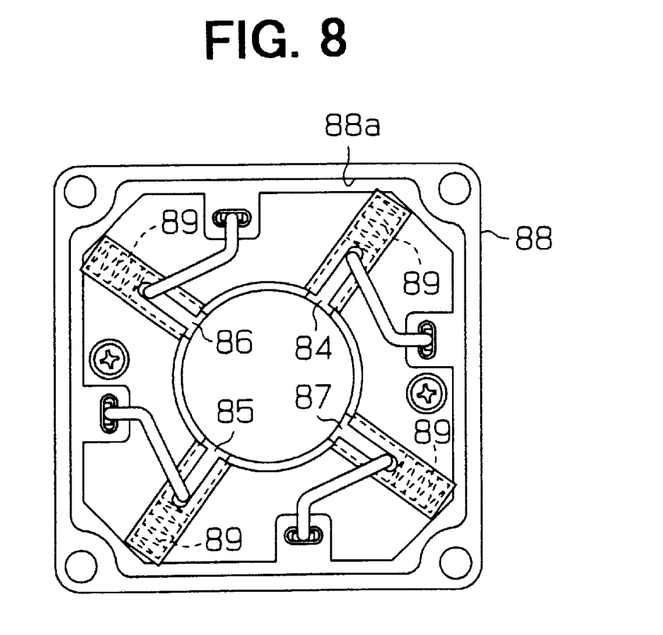
FIG. 8 is a side view showing a brush arrangement in a third embodiment of the present invention.

In this embodiment, the motor device 1 has four brushes 84–87 as shown in FIG. 8. Specifically, the yoke-side end of a gear housing 88 is formed in a generally square shape when viewed in the axial direction of the rotary shaft 7 in the same manner as in the gear housing 20. This end is formed with a brush accommodating recess 88a formed in a generally square shape when viewed in the axial direction of the rotary shaft 7. The four brushes 84–87 are arranged at the corners along the generally diagonal lines in the brush accommodating chamber 83a.

In this third embodiment, the advantages (1)–(4) of the first embodiment can be provided similarly.

The above embodiments may be modified or altered as follows.

The number of the brushes may be only one, as long as it is arranged along the generally diagonal line in the brush accommodating recess 20a. According to this modification, the life of brush can be increased as well by increasing the length of the at least one of the brushes.

The length of each side of the brush accommodating recess 20a need not be generally the same as the diameter of the, cylindrical part of the yoke 4. For instance, the length of the brush can be made further longer by sizing the length of each side of the brush accommodating recess 20a to be longer than the diameter of the cylindrical part 4b of the yoke 4. Even if the length of each side of the brush accommodating recess 20a to be shorter than the diameter of the cylindrical part 4b of the yoke 4, the entire size of the motor can be reduced while maintaining the same brush length as in the conventional one.

The brush accommodating recess 20a may be formed in other shapes as long as it is at least partially larger than the inner periphery of the yoke 4 in the radial direction. For instance, the brush accommodating recess 20a may be formed in a shape which is generally circular but extends in the radial direction only at locations where the brushes are arranged when viewed in the direction of the rotary shaft 7. In this modification as well, the length of the brush can be increased to prolong the life of the brush.

The capacitors 52, 53 may be positioned at different locations. In this modification as well, the advantages (1)–(4) of the first embodiment can be provided similarly.

Noise-suppressing circuit elements other than the capacitors 52, 53, that is, choke coils 50, 51, may be disposed outside the inner periphery 4d of the yoke 4 in the radial direction while being disposed at least partially in the brush accommodating chamber 20a. Further, the circuit breaker 54 may be disposed outside the inner periphery of the yoke 4 in the radial direction while being disposed at least partially in the brush accommodating recess 20a. This arrangement ensures a sufficient space for the circuit breaker 54, and no additional space need be provided at other locations.

The helical torsion springs 68–70 in the above embodiment may be modified to compression coil springs 89 as shown in FIGS. 7 and 8. In this modification, the brushes 81, 82, 84–87, and the compression coil springs 89 can be disposed without being restricted by the inner periphery 4d of the yoke 4.

What is claimed is:

1. A motor device comprising:

a yoke formed generally in a bottomed cylindrical shape;

a rotor in which an armature and a commutator are fixed to a rotary shaft and which is generally accommodated in the yoke;

brushes force-contacted to the commutator; and a gear housing accommodating a reduction member which produces output after reducing a rotation speed of the rotor, and fixed in an opening of the yoke, wherein:
the commutator and the brushes are disposed within the gear housing which is located outside the opening of the yoke in an axial direction of the rotary shaft;
a brush accommodating recess is formed in the gear housing at an axial end on a side of the yoke, the recess being larger at least partly than an inner periphery of the yoke in a radial direction;
the brushes are disposed within the brush accommodating recess to extend in a space which is larger than the inner periphery;
the brush accommodating recess is formed generally in a square shape when viewed in the axial direction of the rotary shaft;
the brushes are disposed generally along a diagonal line in the brush accommodating recess;
the yoke is formed with a flange around the opening of the yoke so that the flange covers an opening of the brush accommodating recess, the flange being generally in the square shape when viewed in the axial direction of the rotary shaft; and
the brushes are disposed at two opposing corners of the brush accommodating recess, respectively.

2. The motor device as in claim 1, wherein:

housing-side fitting parts are formed at two corners of the axial end of the gear housing, respectively, where the brushes are not disposed, the two corners being radially outside of the cylindrical shape of the yoke;

yoke-side fitting parts are formed at two opposing corners of the flange, respectively, the two corners being radially outside of the cylindrical shape of the yoke; and the gear housing and the yoke are fixed to each other by the housing-side fitting parts and the yoke-side fitting parts.

3. A motor device comprising:

a motor unit having a cylindrical yoke formed with a flange at one axial end thereof, a rotary shaft rotatably supported in the yoke and extending outward through the flange in an axial direction;

a reduction unit having a housing formed at one axial end thereof with a flange coupled with the flange of the yoke and accommodating a reduction device engaged with the rotary shaft, the flange of the reduction unit providing a generally square-shaped recess radially inside threreof;

a cylindrical commutator fixed to the rotary shaft in the recess; and at least two brushes disposed in the recess to oppose each other through the rotary shaft and biased to contact the commutator along a diagonal line of the recess passing through a center of the rotary shaft.

4. The motor device as in claim 3, wherein:

the recess has four sides each of which is in generally the same length as a diameter of the yoke.

5. The motor device as in claim 3, wherein:
the flange of the yoke is generally square-shaped in correspondence with the flange of the housing; and
the flange of the yoke and the flange of the housing are fixed to each other by a screw passing through corners of the flanges, the corners of the flanges being radially outside of the yoke.

6. The motor device as in claim 5, wherein:
the at least two brushes are disposed along the diagonal line defined by two corners of each of the flanges; and
the screw is provided in another two corners of each of the flanges.

7. The motor device as in claim 3, further comprising:
a circuit unit including capacitors and choke coils for electrical noise suppression and accommodated in the housing at a position adjacent to the at least two brushes in the axial direction and opposite the reduction device in the radial direction of the rotary shaft.

8. A motor device comprising:
a generally cylindrical yoke having a yoke flange extending radially outwardly from one axial end thereof;
a rotor including a rotary shaft extending axially outwardly from the yoke, an armature, and a commutator supported on the rotary shaft axially outside the yoke flange;
a plurality of brushes force-contacted to the commutator; and
a gear housing for accommodating a reduction member engaged with the rotary shaft, and having a housing flange extending radially outwardly from one axial end thereof and a recess at the axial end thereof to accommodate the commutator and the brushes therein, wherein the recess is generally square shaped and has a distance between parallel opposing sides generally equal to a diameter of the cylindrically shaped yoke and a diagonal distance between opposing corners that is longer than the diameter of the cylindrically shaped yoke;

wherein the commutator is disposed generally at a center of the square shaped recess and the brushes are arranged on a diagonal line of the square shaped recess, and wherein the yoke flange and the housing flange are fixed to each other at a position radially outside of the cylindrically shaped yoke.

* * * * *